United States Patent [19]

Lipner et al.

[11] Patent Number: 5,253,186
[45] Date of Patent: Oct. 12, 1993

[54] PROCESS FACILITY MONITORING METHOD INCLUDING TRANSFORMATION OF SEQUENTIAL CONDITIONS INTO CONSTRAINING CONDITIONS

[75] Inventors: Melvin H. Lipner, Monroeville; Albert J. Impink, Jr., Murrysville, both of Pa.

[73] Assignee: Westinghouse Electric Corp., Pittsburgh, Pa.

[21] Appl. No.: 772,826

[22] Filed: Oct. 7, 1991

[51] Int. Cl.⁵ .............................................. G21C 7/36
[52] U.S. Cl. ............................. 364/551.01; 364/550; 376/216
[58] Field of Search ................... 364/550, 551.01, 183; 376/215, 216, 217

[56] References Cited

U.S. PATENT DOCUMENTS

| | | |
|---|---|---|
| 4,632,802 | 12/1986 | Herbst et al. . |
| 4,695,965 | 9/1987 | Fujita et al. ........................... 364/550 |
| 4,740,349 | 4/1988 | Loftus et al. . |
| 4,801,421 | 1/1989 | Ackerson et al. . |
| 4,803,039 | 2/1989 | Impink, Jr. et al. . |
| 4,803,040 | 2/1989 | Gross . |
| 4,815,014 | 3/1989 | Lipner et al. . |
| 4,816,208 | 3/1989 | Woods et al. . |
| 4,853,175 | 8/1989 | Book, Sr. . |
| 4,902,469 | 2/1990 | Watson et al. . |
| 4,907,176 | 3/1990 | Bahnick et al. ................ 364/551.01 |
| 4,908,775 | 3/1990 | Paulusamy et al. . |
| 4,933,885 | 6/1990 | Kato et al. ...................... 364/551.01 |
| 5,063,527 | 11/1991 | Price et al. ........................... 364/550 |
| 5,068,080 | 11/1991 | Impink, Jr. et al. ................ 364/550 |
| 5,121,318 | 6/1992 | Lipner et al. ..................... 364/550 |

Primary Examiner—Jack B. Harvey
Assistant Examiner—Jae H. Choi
Attorney, Agent, or Firm—J. C. Valentine

[57] ABSTRACT

A system for a process facility monitors the execution of a procedure in which steps are defined with associated conditions. Each condition is one of an initial condition, sequential condition or constraining condition. While constraining conditions are checked for violations during several steps, sequential conditions are checked only during an associated step. The sequential conditions may be transformed into constraining conditions for subsequent steps by setting a transform flag either prior to execution of the procedure or during execution of the procedure in response to an operator request. Once a transformable sequential condition has been met or the step associated therewith has been completed, an enable flag is set making the sequential condition a transformed condition which is checked at the same time as the predefined constraining conditions.

9 Claims, 4 Drawing Sheets

PROCESS FACILITY MONITORING METHOD INCLUDING TRANSFORMATION OF SEQUENTIAL CONDITIONS INTO CONSTRAINING CONDITIONS

BACKGROUND OF THE INVENTION

1. Field of the Invention

The present invention is directed to a method for monitoring a process facility, such as an electrical power generating plant and, more particularly, to such a method in which sequential conditions which are associated with specific steps of a plant procedure are selectively transformed into constraining conditions which are applicable to several steps of that procedure.

2. Description of the Related Art

In recent years, there have been a variety of systems developed for monitoring the operation of process facilities, such as industrial plants of many types, including both nuclear powered and fossil fueled electrical power generating plants. Many of these systems use artificial intelligence, e.g., expert systems, or other types of computer programs operating on data provided by sensors throughout the plant. One example of such a system is disclosed in U.S. Pat. Nos. 4,803,039 and 4,815,014 which are assigned to the assignee of this application and which are incorporated herein by reference. These patents disclose a system executing a FORTRAN program which includes program code for all of the written procedures for a particular type of operation of a plant, for example, the emergency operating procedures (EOP). As disclosed in allowed U.S. patent application Ser. No. 07/307,831, incorporated herein by reference, this system may be used to monitor the execution of procedures using three classes of conditions which typically exist during execution of a procedure for operating the plant. The first class consists of terminal conditions which include both initial conditions that must be satisfied prior to beginning a procedure and final conditions that determine completion of a procedure. The second class consists of sequential conditions, each of which corresponds to a particular step in the procedure and is intended to be met prior to completing the corresponding step. Finally, there are constraining conditions which remain in effect for several steps. While all of these types of conditions are not always clearly defined in the written procedures, computerization of the procedures requires that the conditions be defined rigorously.

Successful execution of such procedures hinges on the ability of either the operator to guide the system or the system to pace itself through the prespecified sequence of plant state changes defined in the procedure. However, in conventional systems, once a sequential condition has been met, the existing systems do not continue to check to ensure that the sequential condition is maintained. Hence, later during execution of the procedure, the monitoring system would be unaware of any changes in the plant which affect a previously established condition and thus the operator would not be alerted by the system of the non-existence of an assumed condition.

On the other hand, constraining conditions are based on precautions, limitations, notes, etc. in written procedures. Constraining conditions are assumed to be passive unless violated. Hence, typically, the operator is not informed about constraining conditions, unless a violation has occurred or is impending. If such an event occurs, conventional systems alert the operator, indicate the problem by text or graphics and require acknowledgement that the operator has become aware of the situation. All applicable constraining conditions are tested in each pass through a continuously executed loop in a computer program. Typically, the loop is interrupted only from the time a violation is detected until the operator's acknowledgement is received. A complete loop is executed periodically with a frequency that depends upon the capabilities of the system and the type of operation being monitored.

In a conventional system, due to the necessity to clearly encode all sequential and constraining conditions, the only way to have a particular condition included as a sequential condition in a particular step and thereafter monitored continuously is to include separate blocks of computer program code in both the sequential steps and in the set of constraining conditions. The constraining condition must become effective only after completion of the step in which the corresponding sequential condition appears. This requires careful verification of the computer program to ensure that the same condition is being tested at the appropriate times. In a computerized procedure for a complex process facility, such as a nuclear power plant, there may be tens of thousands of lines of code and verification is not a trivial task. Furthermore, there is no opportunity for an operator to select a sequential condition to be continually monitored after the sequential condition is met, based upon recent experiences in operating the plant.

SUMMARY OF THE INVENTION

An object of the present invention is to provide a flexible process facility monitoring system.

Another object of the present invention is to provide a process facility monitoring system which permits facility operators to identify conditions to be continually monitored which normally would not be monitored continually.

Yet another object of the present invention is to provide a process facility monitoring system capable of transforming sequential conditions tested during a single procedure step into constraining conditions tested continuously for several procedure steps.

The above objects are attained by providing a method of monitoring the operation of a process facility, comprising the steps of: storing in machine readable form a procedure defining steps for operating the process facility with conditions associated with the steps defined as one of initial conditions, sequential conditions and constraining conditions; automatically monitoring execution of each of the steps of the procedure by comparing sensor readings in the process facility with the sequential conditions corresponding to an associated step and displaying, during execution of the associated step, indications of whether the sequential conditions are met; automatically comparing the sensor readings in the process facility with the constraining conditions during execution of the steps in the procedure and generating first warning indications for any violated constraining conditions; and comparing the sensor readings with transformed conditions, selected from among the sequential conditions, during the steps following the associated step corresponding to each of the transformed conditions and generating second warning indications for any violated transformed conditions.

The transformation of sequential conditions into constraining conditions may be controlled by transform flags indicating which of the sequential conditions should be selected to become transformed conditions. The transform flags may be predefined prior to executing the procedure or may be temporarily set by the operator during execution of the procedure. In the latter case, the system preferably provides a menu which may be requested by the operator to display a list of sequential conditions for a current step, so that the operator may indicate which of the sequential conditions should be transformed into constraining conditions at the end of the step.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
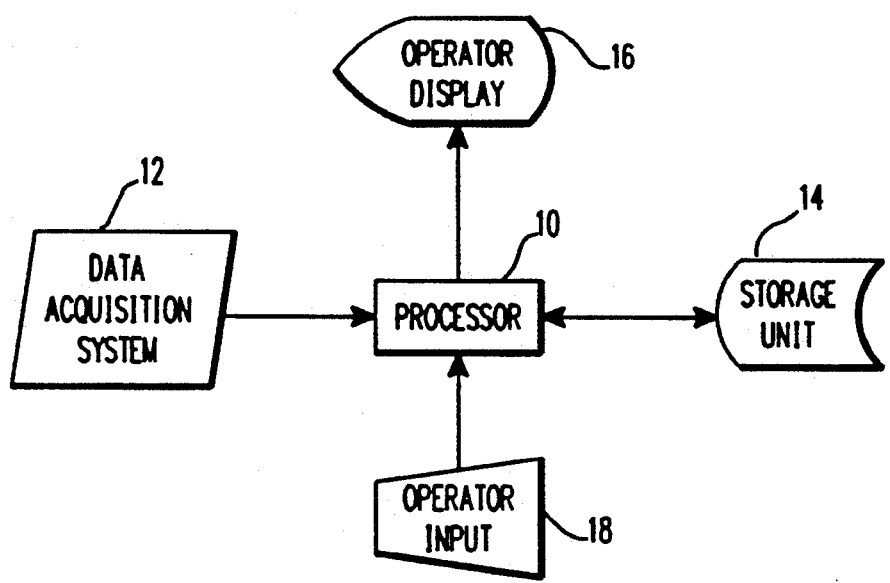
FIG. 1 is a block diagram of a process facility monitoring system to which the present invention may be applied.

The basic blocks in a process facility monitoring system to which the present invention could be applied are illustrated in FIG. 1. As illustrated in FIG. 1, a processor 10 which may be included in a workstation, such as a SPARCstation 2 from SUN Microsystems, Inc. of Mountain View, Calif., receives data from sensors (not shown) in the process facility via a data acquisition system 12 while operating under the control of a program stored in a storage unit 14. The data acquisition system 12 may be any conventional system adequate for the number of sensors required and connectable to the processor 10, while the storage unit 14 may be any of a variety of mass storage devices, used individually or in combination. Since the purpose of the system illustrated in FIG. 1 is to provide information to an operator of the process facility, an operator display 16, such as a cathode ray tube display is provided. An operator input unit 18, such as a mouse, touch screen, light-pen, keyboard, etc., permits the operator to control what is displayed.

Figure 2:
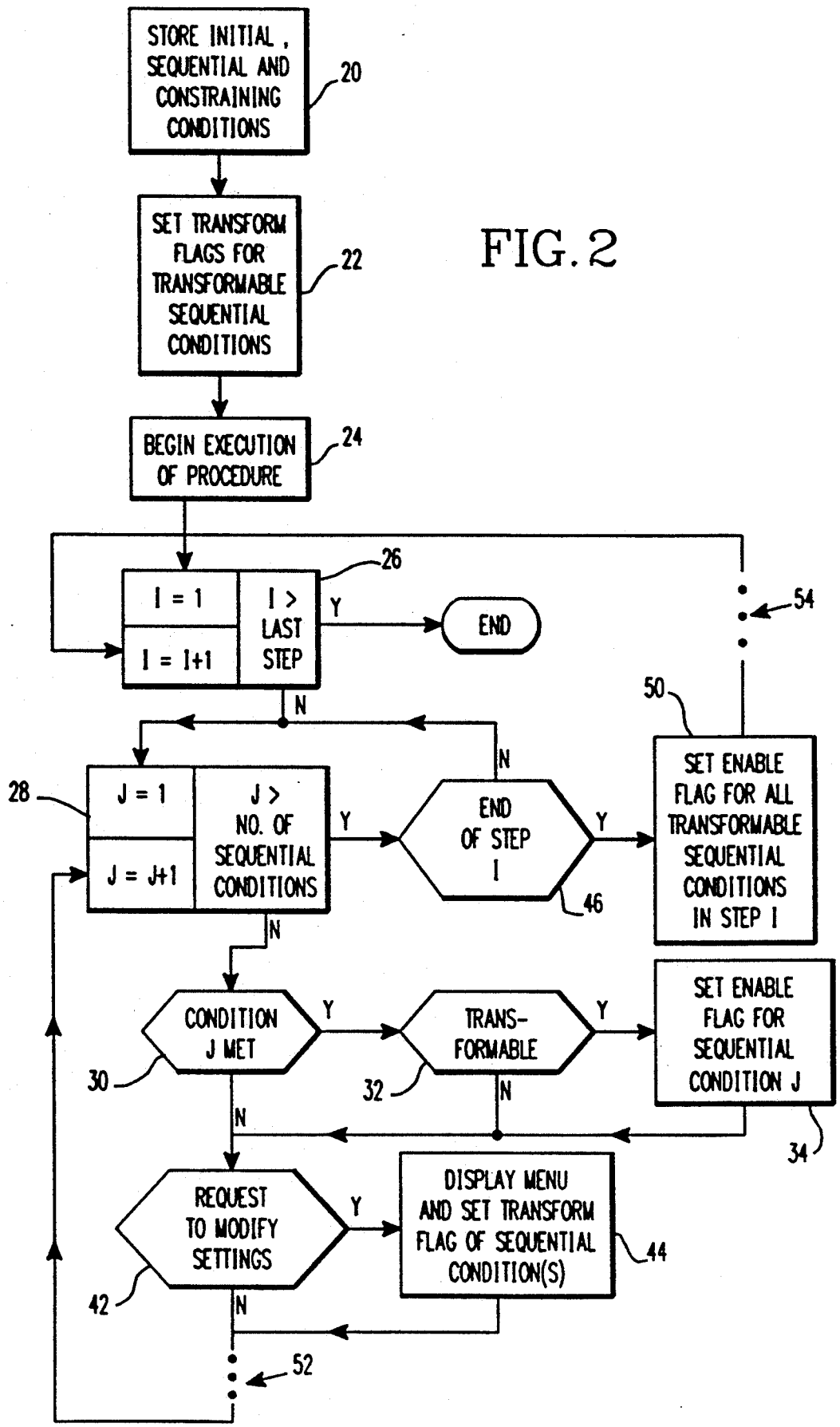
FIG. 2 is a flowchart of a task for sequential conditions.

As illustrated in FIG. 2, like the conventional process facility monitoring system disclosed in U.S. Pat. Nos. 4,803,039 and 4,815,014, it is necessary to store 20 initial, sequential and constraining conditions for a procedure to be monitored. In addition, the text of the procedure and other related information also may be stored in the storage unit 14. The conditions and related information may be stored in many different forms. As noted above, the two referenced patents disclose a system which has been implemented by encoding all of the conditions in a FORTRAN program, while other systems which monitor process facilities in a different manner utilize expert systems. It is also possible to use external files, accessed by a program, to store much of the information. In the preferred embodiment, an external file may be used for ease of updating. One of the files may contain transform flags which may be set 22 to designate transformable sequential conditions prior to beginning 24 execution of the procedure.

The purpose of monitoring systems of the type to which the present invention is applied is to aid an operator in executing the steps of a procedure. For a complex process facility, such as a nuclear power plant, the procedures are not the simple execution of one step after another, but may contain branches, steps which may be skipped or performed in any order or simultaneously, etc. Since the present invention is not directed to the order of execution of steps per se, FIG. 2 indicates the execution of multiple steps by loop block 26. However this should not be taken as a literal description of how the steps must be executed, but rather as a recognition that a procedure includes many steps and involves progressing from one step to another with a defined relationship between the steps, even though the relationship may not be so simple that steps change by incrementing an iteration value.

Regardless of how the order of execution of the steps is defined, at least one step is executed at a time. Each step may have several sequential conditions corresponding to the step. According to the defined procedure, all of these sequential conditions should be met to complete a step. In a computer task for checking sequential conditions, a sequential condition loop block 28 may be used to control repeated checks of the sequential conditions associated with a corresponding step I. An iterative value J is initialized and incremented by the loop block 28 so that each sequential condition can be compared with sensor readings in the process facility to determine 30 whether the condition is met. When a condition has been met, the transform flag is checked 32 and if the transform flag is set, an enable flag for sequential condition J is set 34.

In addition to predefined transformable sequential conditions, in the preferred embodiment the operator is given the ability to select sequential conditions to be tracked as transformed conditions in the same manner as constraining conditions are tracked. This may be accomplished in several ways. The operator display 16 could be used to display the sequential conditions and the process facility status corresponding to these conditions. Associated with the display of this information could be a box which the operator may check using the operator input device 18. In this case, all or a selected set of the sequential conditions for the current executing step may have such a box.

Figure 3:
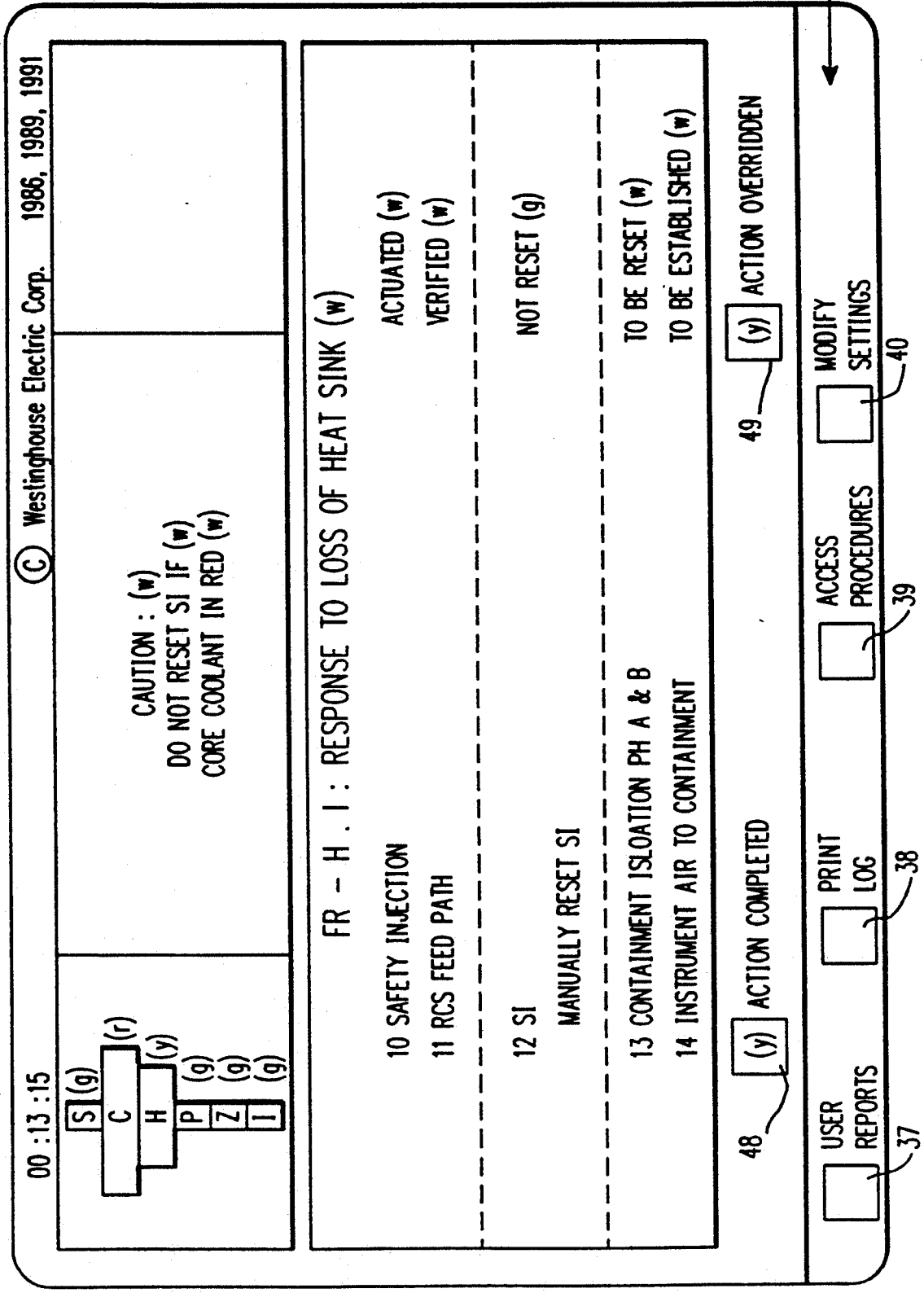
FIG. 3 is an example of a display screen during execution of a procedure according to the present invention.

In most applications, it is expected that an operator will rarely select a sequential condition to be transformed into a constraining condition. Therefore, in the preferred embodiment, a display screen like that illustrated in FIG. 3 is displayed on the operator display 16. At the bottom of the screen is a command menu 36 which may include command buttons 37–40 for selecting auxiliary screens. These screens permit selection of items, such as user reports, print log, access to other procedures, etc. As indicated by command button 40, one of the options which may be provided in the command menu 36 is to modify settings. When a request to modify settings is detected 42 (FIG. 2) by an operator selecting the area of command button 40 using a touch screen, light pen, mouse, etc. in the input unit 18, a menu is displayed 44 permitting the operator to set the transform flag of a sequential condition. The display may be limited to the sequential conditions for the currently executing step I, or the program executing in the processor 10 may permit the operator to scan through the sequential conditions for a number of steps, such as all of the previously executed steps, in addition to the currently executing step and set the transform flag for any sequential condition corresponding to these steps.

When all of the sequential conditions for the currently executing step I have been tested, a determination is made as to whether step I has ended 46. This determination may be made in several ways. The process facility monitoring method disclosed in U.S. Pat. Nos. 4,803,039 and 4,815,014 include action buttons 48, 49 which permit the operator to indicate when an action has been completed 48 or if an action is to be overridden 49. When all of the actions within a step have been indicated as completed or overridden, a determination will be made 46 that step I has ended. Alternatively, the process facility monitoring system may be computer paced, whereby the sensor readings must indicate that all of the sequential conditions have been met in order for the determination 46 to be made that step I has ended.

Regardless of how the determination 46 is made, according to the present invention the enable flag for all transformable sequential conditions in step I are set 50 when the determination 46 is made that step I has ended. Thus, if a transformable sequential condition is overridden in a step, the enable flag corresponding to that condition will be set 50 so that the sequential condition will continue to be checked as a constraining condition in the subsequent steps. In an alternative embodiment, the check for a transform flag and setting of an enable flag as each condition is met which is indicated in blocks 30, 32, 34, may be eliminated and the setting 50 of enable flags at the end of each step may be relied upon.

Figure 4:
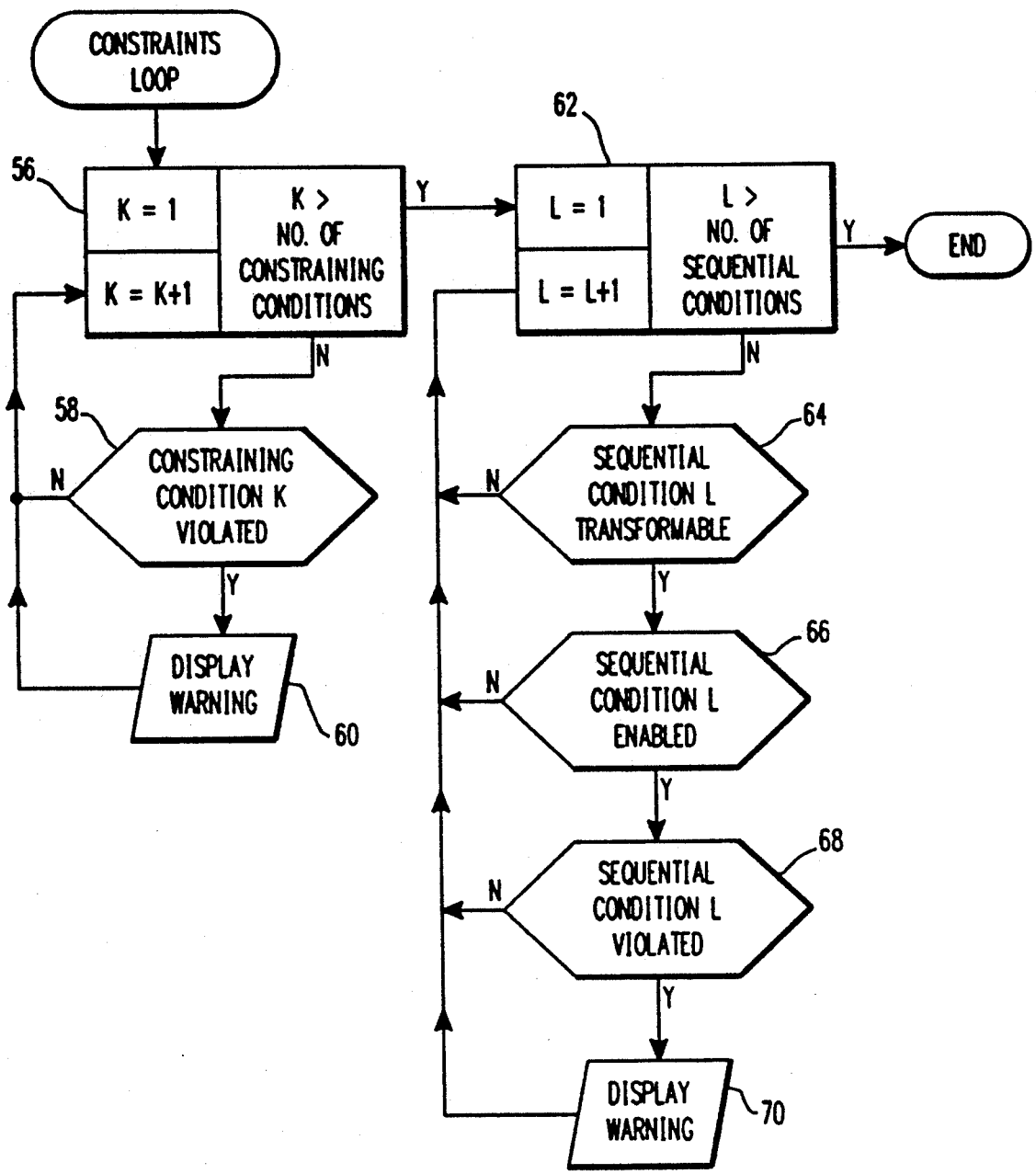
FIG. 4 is a flowchart of a task for constraining conditions.

As described above, in addition to moving sequentially through a procedure, a process facility monitoring system like that disclosed in U.S. Pat. Nos. 4,803,039 and 4,815,014 continually checks constraining conditions. When transformable sequential conditions are included according to the present invention, the program steps illustrated in FIG. 4 will be executed in checking constraining conditions. As in the case of FIG. 2, the flowchart in FIG. 4 is representative of the computer operations which must be performed. These steps can be implemented in many ways. If the processor 10 is capable of multi-tasking operation, the sequential condition iteration loop controlled by block 26 of FIG. 2 may be located in one or more tasks, while the computer program code represented by the flowchart in FIG. 4 is in a separate task. In this manner, the multi-tasking operating system will control the simultaneous execution of the program flow in FIGS. 2 and 4. Alternatively, a single application program may be written encompassing both FIGS. 2 and 4 and the program code corresponding to the blocks illustrated in FIG. 4 may be inserted in place of one of the ellipses 52, 54 in FIG. 2, or some other timing mechanism may be used to determine when the constraints loop illustrated in FIG. 4 is performed.

Regardless of exactly how it is determined to execute the constraints loop in FIG. 4, each of the constraining conditions must be checked in some manner at appropriate times during execution of a procedure. In FIG. 4, a constraints loop block 56 is illustrated as one example of how to control checking all of the constraining conditions. However, the present invention may be implemented in an expert system or using other software which does not support iteration loops, but has other known mechanisms for repeatedly checking a large number of conditions. Regardless of how the constraining conditions are checked, a determination is made 58 whether a constraining condition is violated and a warning is displayed 60 for those constraining conditions which are found to be violated.

In addition, an iteration loop block 62 or other means for checking transformable sequential conditions is provided. For each sequential condition, determinations must be made regarding whether the sequential condition is transformable 64 and if so whether it has been enabled 66. If these determinations are made in the affirmative, the condition is a transformed condition which will be treated like a constraining condition and checked to determine 68 whether the condition has been violated. A warning will be displayed 70 in a manner similar to that for constraining conditions when a transformed condition is violated.

As noted above, the present invention may be implemented in many ways. In the case of complex procedures, it is common to have a computer-based procedure maintaining support system for defining the procedures. The system used for computer-based support may provide means for automatically generating the control codes to create transformable sequential conditions. In a case where a FORTRAN program is used to provide a process facility monitoring system, instead of having transform flags, the procedure maintaining support system may copy FORTRAN code from a sequential condition group of statements to a constraining condition group of statements. This copying of course could be performed manually, although as noted above the benefits of ensuring consistency and accuracy of the conditions being checked is not as easily maintained when the copying is performed manually.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, as falling within the scope and spirit of the invention.

What is claimed is:

1. A method of monitoring operation of a process facility, comprising the steps of:
   (a) storing in machine readable form a procedure defining steps for operating the process facility with conditions associated with the steps, each of the conditions defined as one of initial conditions, sequential conditions and constraining conditions;
   (b) automatically monitoring execution of each of the steps of the procedure by comparing sensor readings in the process facility with the sequential conditions corresponding to an associated step and displaying, during execution of the associated step, indications of whether the sequential conditions are met;
   (c) automatically comparing the sensor readings in the process facility with the constraining conditions during execution of the steps in the procedure and generating first warning indications for any violated constraining conditions; and (d) automatically comparing the sensor readings with transformed conditions, selected from among the sequential conditions, during the steps following the associated step corresponding to each of the transformed conditions and generating second warning indications for any violated transformed conditions.

2. A method as recited in claim 1,
wherein said storing in step (a) includes storing predefined transform flags prior to execution of the procedure, the predefined transform flags associated with the sequential conditions previously determined to become the transformed conditions, and
wherein said comparing in step (d) includes selecting the transformed conditions in dependence upon the predefined transform flags.

3. A method as recited in claim 2,
further comprising the step of (e) adding a temporary transform flag during execution of the procedure for a corresponding sequential condition, in dependence upon an operator request, and
wherein said comparing in step (d) includes selecting the transformed conditions in dependence upon both the predefined and temporary transform flags.

4. A method as recited in claim 3,
further comprising the step of (f) displaying a menu permitting addition of the temporary transform flag for any of the sequential conditions associated with a currently executing step of the procedure, in response to a menu request from an operator, and
wherein said adding in step (e) comprises receiving a selection indication from the operator to indicate the corresponding sequential condition for the temporary transform flag to be added.

5. A method as recited in claim 1,
further comprising the step of (e) setting, in dependence upon an operator request, a transform flag during execution of the procedure for each of the sequential conditions designated to become one of the transformed conditions, and
wherein said comparing in step (d) includes selecting the transformed conditions in dependence upon whether the transform flag, corresponding to each of the sequential conditions, is set.

6. A method as recited in claim 1, wherein said comparing in step (d) includes selecting each of the transformed conditions only after completion of a corresponding step associated therewith, regardless of whether each of the transformed conditions is met by the completion of the corresponding step.

7. An apparatus for monitoring operation of a process facility, comprising:
means for storing in machine readable form a procedure defining steps for operating the process facility with conditions associated with the steps, each of the conditions defined as one of initial conditions, sequential conditions and constraining conditions;
means for monitoring execution of each of the steps of the procedure by comparing sensor readings in the process facility with the sequential conditions corresponding to an associated step and displaying during execution of the associated step indications of whether the sequential conditions are met;
first comparison means for comparing the sensor readings in the process facility with the constraining conditions during execution of the steps in the procedure and generating first warning indications for any violated constraining conditions; and
second comparison means for comparing the sensor readings with transformed conditions, selected from among the sequential conditions, during the steps following the associated step corresponding to each of the transformed conditions and generating second warning indications for any violated transformed conditions.

8. An apparatus as recited in claim 7,
further comprising means for setting, in dependence upon an operator request, a transform flag during execution of the procedure for each of the sequential conditions designated to become one of the transformed conditions, and
wherein said second comparison means includes means for selecting the transformed conditions in dependence upon whether the transform flag, corresponding to each of the sequential conditions, is set.

9. An apparatus as recited in claim 8,
further comprising means for displaying a menu permitting addition of the transform flag for any of the sequential conditions associated with a currently executing step of the procedure, in response to a menu request from an operator, and
wherein said setting means comprises means for receiving a selection indication from the operator to indicate setting of the transform flag for one of the sequential conditions.

* * * * *